(12) United States Patent
Day

(10) Patent No.: US 11,938,701 B2
(45) Date of Patent: Mar. 26, 2024

(54) ELECTROMAGNETIC RADIATION PERMEABLE GLAZING

(71) Applicant: PILKINGTON GROUP LIMITED, Lathom (GB)

(72) Inventor: Stephen Roland Day, Wigan (GB)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 17/913,194

(22) PCT Filed: Mar. 24, 2021

(86) PCT No.: PCT/GB2021/050721
§ 371 (c)(1),
(2) Date: Sep. 21, 2022

(87) PCT Pub. No.: WO2021/191608
PCT Pub. Date: Sep. 30, 2021

(65) Prior Publication Data
US 2023/0144425 A1 May 11, 2023

(30) Foreign Application Priority Data

Mar. 25, 2020 (GB) ..................... 2004302

(51) Int. Cl.
*B32B 15/04* (2006.01)
*B32B 17/06* (2006.01)
*B32B 17/10* (2006.01)
*B32B 33/00* (2006.01)

(52) U.S. Cl.
CPC ...... *B32B 17/10036* (2013.01); *B32B 17/068* (2013.01); *B32B 17/10183* (2013.01); *B32B 17/10238* (2013.01); *B32B 17/1044* (2013.01); *B32B 33/00* (2013.01); *B32B 2250/02* (2013.01); *B32B 2255/205* (2013.01); *B32B 2255/28* (2013.01); *B32B 2264/101* (2013.01); *B32B 2264/401* (2020.08);
(Continued)

(58) Field of Classification Search
CPC ..................... B32B 17/10183; B32B 17/1044
USPC .................................. 428/432, 434
See application file for complete search history.

(56) References Cited

U.S. PATENT DOCUMENTS

| 5,620,799 A | 4/1997 | Sauer |
| 5,867,129 A | 2/1999 | Sauer |

(Continued)

FOREIGN PATENT DOCUMENTS

| EP | 07175459 A1 | 6/1996 |
| EP | 3309343 A1 | 4/2018 |

(Continued)

*Primary Examiner* — Lauren R Colgan
(74) *Attorney, Agent, or Firm* — Marshall & Melhorn, LLC

(57) ABSTRACT

A glazing includes at least one transparent substrate comprising a first major surface and an opposing second major surface, wherein said first major surface is coated with an electrically conductive layer and the electrically conductive layer is absent in one or more regions of the first major surface. At least a portion of the one or more regions of the first major surface, and/or corresponding regions of the opposing second major surface, bears a low-emissivity material, and the one or more regions permit the passage of electromagnetic radiation through the glazing.

20 Claims, 2 Drawing Sheets

(52) U.S. Cl.
CPC ..... *B32B 2305/30* (2013.01); *B32B 2307/202* (2013.01); *B32B 2307/412* (2013.01); *B32B 2307/416* (2013.01)

(56) References Cited

U.S. PATENT DOCUMENTS

| | | | | |
|---|---|---|---|---|
| 2007/0036985 A1* | 2/2007 | Kamitani | ................. | C09D 4/00 427/372.2 |
| 2007/0178317 A1* | 8/2007 | Kodaira | ................ | C03C 17/008 428/432 |

FOREIGN PATENT DOCUMENTS

| | | | |
|---|---|---|---|
| WO | 2006043026 A1 | 4/2006 |
| WO | 2014057267 A1 | 4/2014 |

\* cited by examiner

ELECTROMAGNETIC RADIATION PERMEABLE GLAZING

BACKGROUND OF THE INVENTION

The present invention relates to a glazing with an electrically conductive layer that is permeable to electromagnetic radiation and which exhibits low-emissivity properties in the regions of permeability. The invention also relates to a method of preparing said glazing and the use of said glazing.

It is known in the art to provide glazings with electrically conductive layers to reduce the transmission of IR through windows. It is also known that these conductive coatings significantly attenuate the propagation of radio waves and microwaves. The attenuation of radio and microwave communication signals is typically an unwanted side effect of these electrically conductive layers. By removing some selected parts of these conductive layers, radio and microwave communication can be restored. For example, U.S. Pat. No. 5,867,129 mentions a window with an electrically conductive layer which, while shielding against electromagnetic radiation of long wavelengths and reflecting infrared radiation, allows microwaves to pass through. This is achieved by the electrically conductive layer containing at least one slit whose length is a function of the wavelength of microwave radiation. Preferably in this example the slits are not visible with the naked eye as they would be a distraction to the vehicle driver. These conductive coatings do interact with visible light and it is practically impossible to remove them in a way that the removal cannot be noticed by the human eye. The removal may be noticed because the light transmission is varied or the glazing colour is varied.

It is known that many glass coatings are created from multiple layers of different composition. It is common that each layer will have a precisely computed thickness and refractive index so that as far as is practical the conductive coating as a whole is visibly transparent and neutrally coloured. Deletion or omission of a part of the conductive coating has the effect that the boundaries between coated and uncoated areas can become particularly noticeable to the eye because these precise layer thicknesses become locally disturbed on the boundary of the etching or selective deposition of the coating.

U.S. Pat. No. 5,620,799 describes a glazing with good transmissivity in a particular area for a part of the electromagnetic spectrum that allows data to be transmitted. Over the rest of the surface the same radiation is prevented from passing through by being reflected and/or absorbed. The glazing may have a metallic coating and has a transmitter and/or receiver in said area. To mitigate the effect of the area being distinguishable from the rest of the glazing with the naked eye, and to give the glazing a homogeneous appearance, the glazing may be selectively tinted to a darker optical shade. It is common practice in automotive glass design to tint the glazing across the upper edge of the windscreen to reduce solar glare to the vehicle occupants. U.S. Pat. No. 5,620,799 makes the point that the area created for data transmission is less visually noticeable when it is in the tinted glazing area. It also highlights that the tinting shade can be variable and be particularly intense in the region of the data transmission area.

EP 0717459 describes a glazing with a metallic layer that has a pattern in the form of a grid of spacings in the layer arranged to allow microwaves and electromagnetic radiation of longer wavelength to pass through. A planar aerial for microwave reception may be disposed behind the grid. The width of the grid lines cut into the conductive coating by laser is described as 0.1 mm-0.05 mm so that they are optically relatively difficult to visually detect.

Modern society expects easy use of mobile phones and other devices particularly when the user is stood in proximity to a window that gives a visual view of the outside world. If this window is a solar IR controlling window then such a location is generally poor for radio and microwave transmission and reception. However, omitting or removing the conductive coatings from these glazings in at least some regions causes IR heat loss or gain which can be unacceptable.

Thus, it would be beneficial to provide a glazing with an electrically conductive layer that allows the passage of electromagnetic radiation without notable loss of low-emissivity properties.

SUMMARY OF THE INVENTION

According to a first aspect of the present invention there is provided a glazing comprising: at least one transparent substrate comprising a first major surface and an opposing second major surface,
  wherein said first major surface is coated with an electrically conductive layer,
  wherein the electrically conductive layer is absent in one or more regions of the first major surface,
  wherein at least a portion of
  i) said one or more regions of the first major surface, and/or
  ii) corresponding regions of the opposing second major surface, bears a low-emissivity material, and
  wherein said one or more regions permit the passage of electromagnetic radiation through the glazing.

Accordingly the glazing of the present invention provides the advantages of allowing electromagnetic radiation such as mobile or cellular phone signals to pass through the glazing whilst retaining excellent low-emissivity properties.

In the context of the present invention, the "corresponding regions" of the opposing second major surface means the regions of the opposing second major surface that entirely overlap with the one or more regions of the first major surface when viewed perpendicular to the first major surface.

In the context of the present invention, the passage of electromagnetic radiation "through the glazing" means the passage of electromagnetic radiation from a location exterior to the first major surface to a location exterior to the opposing second major surface or vice versa.

In the context of the present invention, where a layer is said to be "based on" a particular material or materials, this means that the layer predominantly consists of the corresponding said material or materials, which means typically that it comprises at least about 50 at. % of said material or materials.

In the following discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention.

Typically, when referring to compositions, a composition consisting essentially of a set of components will comprise less than 5% by weight, typically less than 3% by weight, more typically less than 1% by weight of non-specified components.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

References herein such as "in the range x to y" are meant to include the interpretation "from x to y" and so include the values x and y.

In the context of the present invention a transparent material is a material that is capable of transmitting visible light so that objects or images situated beyond or behind said material can be distinctly seen through said material.

In the context of the present invention the "thickness" of a layer is, for any given location at a surface of the layer, represented by the distance through the layer, in the direction of the smallest dimension of the layer, from said location at a surface of the layer to a location at an opposing surface of said layer.

Preferably at least a portion of each of said one or more regions of the first major surface where the electrically conductive layer is absent bears a low-emissivity material. Preferably substantially all, more preferably all, of each of the one or more regions of the first major surface where the electrically conductive layer is absent bears a low-emissivity material.

Preferably the low-emissivity material exhibits an emissivity of less than 0.3, more preferably less than 0.2, even more preferably less than 0.1, most preferably less than 0.05. Preferably the glazing exhibits an emissivity of less than 0.4, more preferably less than 0.3, even more preferably less than 0.2, most preferably less than 0.1. Emissivity can conveniently be measured using a commercially available spectrometer in accordance with EN 12898:2019.

Preferably the glazing exhibits an emissivity of less than 0.4, more preferably less than 0.3, even more preferably less than 0.2, most preferably less than 0.1. Preferably said emissivity is an average emissivity calculated by measuring the emissivity of and taking into account the relative surface area of
1) regions of the first major surface of the transparent substrate where the electrically conductive layer is present,
2) regions of the surface(s) of the transparent substrate that bear the low emissivity material, and
3) regions of the first major surface of the transparent substrate where both the electrically conductive layer and the low emissivity material are absent, wherein corresponding regions of the opposing second major surface of the transparent substrate also lack the low emissivity material.

Preferably the regions of the surface(s) that bears the low emissivity material exhibit an emissivity of less than 0.5, more preferably less than 0.4, even more preferably less than 0.3, most preferably less than 0.2.

The low-emissivity material may comprise one or more of a coated glass, a coated microbead, a dielectric multilayer coating, a metal and/or a metal oxide.

The coated glass and/or coated microbead are preferably coated with a low-emissivity coating. The low-emissivity coating may comprise at least one layer based on an IR reflective metal or IR reflective metal oxide. The IR reflective metal may be any suitable metal such as silver, gold or aluminium. The IR reflective metal oxide may be any suitable oxide such as titania or alumina or a transparent conductive oxide (TCO). The TCO may be any suitable TCO such as fluorine doped tin oxide, antimony doped tin oxide or indium doped tin oxide, preferably fluorine doped tin oxide. The coated microbead may be a coated polymeric or coated ceramic microbead.

The dielectric multilayer coating may comprise layers based on non-electrically conductive metal oxides and/or non-electrically conductive metal nitrides. The multilayer coating may comprise a first layer which is a transparent and dielectric film of a metal compound having a refractive index in the range from 1.8 to 2.1 deposited on the first major surface of the transparent substrate, a second layer which is a transparent and dielectric film of a metal compound having a refractive index in the range from 2.2 to 2.5 deposited on the first layer, and a third layer which is a transparent and dielectric film of a metal compound having a refractive index in the range from 1.8 to 2.1 deposited on the second layer. $SnO_x$ ($0<x\le2$), $TaO_x$ ($0<x\le2.5$), $ZrO_x$ ($0<x\le2$) or $AlN_x$ ($0<x\le1$) is useful as a dielectric metal compound having a refractive index in the range from 1.8 to 2.1, and $TiO_x$ ($0<x\le2$) is suitable as a dielectric metal compound having a refractive index in the range from 2.2 to 2.5. It should be noted that the refractive index values described herein are reported as average values across 400-780 nm of the electromagnetic spectrum. The dielectric multilayer coating may further comprise metal particles or metal oxide particles. Such particles can improve low-emissivity properties while permitting the passage of electromagnetic radiation.

The metal may be any suitable metal such as silver, gold or aluminium, preferably silver. The metal oxide may be any suitable metal oxide such as titania or alumina or a TCO such as fluorine doped tin oxide, antimony doped tin oxide or indium doped tin oxide, preferably fluorine doped tin oxide.

The low-emissivity material may be in the form of flakes and/or particles of the coated glass, the coated microbead, the metal and/or the metal oxide. An example of flakes of coated glass is Microglas® Metashine, available from NGF Europe Limited, St Helens, UK. The flakes of metal may be aluminium flakes.

The flakes of coated glass, metal and/or metal oxide preferably have an average thickness of from 0.1-10 µm, more preferably from 1-8 µm, even more preferably from 4-6 µm.

Preferably the flakes of coated glass, metal and/or metal oxide have an average diameter of from 5-4000 µm, more preferably from 10-1700 µm, even more preferably from 20-500 µm, most preferably from 25-150 µm. Preferably, the flakes of coated glass, metal and/or metal oxide have an aspect ratio of average diameter divided by average thickness of greater than or equal to 10, more preferably 15, most preferably 20.

The particles of coated glass, coated microbead, metal and/or metal oxide preferably have an average diameter of 1-1000 µm, more preferably 10-500 µm, even more preferably 20-300 µm. The particles of coated glass may comprise glass microspheres, wherein the glass microspheres may be solid or hollow. Preferably the glass microspheres are solid.

The low-emissivity material may preferably form at least part of a coating and/or a film that is attached to the first major surface of the substrate. Preferably the low-emissivity material is dispersed within the coating and/or the film. Alternatively or additionally the low-emissivity material may form at least part of a layer either located in contact with the glazing, located within the coating and/or the film, or located on an exposed surface of the coating and/or the film. Preferably said layer is non-continuous.

The coating may further comprise a binder such as an epoxy-based resin or a bituminous medium. Preferably the coating has been applied in the form of a paint. The coating may alternatively have been applied using another suitable technique such as chemical vapour deposition or a sol gel process.

The film may preferably be a polymer-based film, e.g. a polyester-based film. Preferably the film is attached to the glazing via an adhesive.

The coating and/or the film may be transparent, opaque or optically diffuse. The coating and/or the film may further comprise a pigment. In some applications it may be aesthetically desirable for the coating and/or the film to be opaque and/or exhibit a non-neutral colour.

Preferably the density of the low-emissivity material is less than 5 $g/cm^3$, more preferably less than 3 $g/cm^3$, even more preferably less than 2 $g/cm^3$, but preferably more than 0.1 $g/cm^3$, more preferably more than 0.5 $g/cm^3$, even more preferably more than 1 $g/cm^3$. Preferably said density is the density of the low-emissivity material that forms at least part of a coating and/or a film that is attached to the first major surface of the substrate.

Preferably the coating and/or film comprises at least 0.5 wt % of the low-emissivity material, more preferably at least 1 wt %, even more preferably at least 2 wt %, but preferably at most 15 wt %, more preferably at most 10 wt %, even more preferably at most 5 wt %.

Preferably the coating has a physical thickness of at least 10 nm, more preferably at least 50 nm, even more preferably at least 100 nm, but preferably at most 1000 nm, more preferably at most 500 nm, even more preferably at most 400 nm.

Preferably the film has a physical thickness of at least 1 micrometre, more preferably at least 10 micrometre, even more preferably at least 50 micrometre, but preferably at most 1000 micrometre, more preferably at most 500 micrometre, even more preferably at most 200 micrometre.

Preferably the one or more regions of the first major surface where the electrically conductive layer is absent are arranged to allow the passage of electromagnetic radiation that corresponds to very high frequencies (30-300 MHz, 10 m-1 m), ultra high frequencies (300-3000 MHz, 1 m-100 mm), and/or super high frequencies (3-30 GHz, 100 mm-10 mm). More preferably the one or more regions of the first major surface where the electrically conductive layer is absent are arranged to allow the passage of electromagnetic radiation that corresponds to very high frequencies (30-300 MHz, 10 m-1 m), ultra high frequencies (300-3000 MHz, 1 m-100 mm), and/or super high frequencies (3-30 GHz, 100 mm-10 mm) only. Preferably said regions where the electrically conductive layer is absent are arranged to allow the passage of electromagnetic radiation that corresponds to ultra high frequencies and/or super high frequencies only and more preferably electromagnetic radiation that corresponds to frequencies at which only mobile phones or cellular phones, and/or devices that can wirelessly connect to the internet, function.

The one or more regions of the first major surface where the electrically conductive layer is absent and/or that bear the low-emissivity material may be located within 100 mm of the periphery of the first major surface, preferably within 75 mm of the periphery, more preferably within 50 mm of the periphery, even more preferably within 30 mm of the periphery, but preferably at least 5 mm from the periphery, more preferably at least 15 mm from the periphery, even more preferably at least 20 mm from the periphery.

The one or more regions of the first major surface where the electrically conductive layer is absent and/or that bear the low-emissivity material may be any suitable shape. In some embodiments, preferably said one or more regions are shaped as strips. Preferably each strip has a width of at least 10 mm, more preferably at least 30 mm, even more preferably at least 40 mm, but preferably at most 200 mm, more preferably at most 100 mm, even more preferably at most 70 mm. Preferably each strip has a length of at least 100 mm, more preferably at least 300 mm, even more preferably at least 400 mm.

Preferably each strip is located substantially parallel, preferably parallel, to a nearest peripheral edge of the first major surface. Preferably each strip has a length that is at least 70% of, more preferably at least 90% of, even more preferably at least 95% of, most preferably substantially the same as, the length of the nearest peripheral edge of the first major surface.

Preferably the electrically conductive layer is transparent. This arrangement enables an observer to have a distinct view through the entire glazing. In some embodiments the transmitted light through the glazing at the portion of said one or more regions of the first major surface that bears the low-emissivity material may be different to the transmitted light through the glazing at regions of the first major surface that do not bear the low-emissivity material. In some embodiments the reflected light through the glazing at the portion of said one or more regions of the first major surface that bears the low-emissivity material may be different to the reflected light through the glazing at regions of the first major surface that do not bear the low-emissivity material. Such arrangements provide an observer with a distinct view through the entire glazing and a visibly perceptible distinction between the regions that bear the low-emissivity material and those that do not. This visible distinction may be apparent under normal light conditions such as daylight and/or artificial light sources. The distinction between the regions that bear the low-emissivity material and those that do not may have the appearance of a watermark effect which is both unobtrusive and readily apparent. In some embodiments the portion of said one or more regions that bears the low-emissivity material may form at least one sign.

The glazing may have both transparent regions and non-transparent regions e.g. opaque regions. Preferably the glazing is substantially completely transparent. Preferably at least 80%, more preferably at least 90%, and even more preferably at least 95% of the glazing is transparent when viewed through a major surface of the glazing, wherein the entire surface area of said major surface is deemed to represent 100% of the glazing for the purposes of these values. Most preferably the glazing is completely transparent.

The one or more regions where the electrically conductive layer is absent and/or that bear the low-emissivity material may be arranged in a repeating pattern. Such an arrangement may enhance the aesthetic appeal of the glazing.

Lighting effects may be used to enhance the visibility and/or aesthetic appeal of the one or more regions where the electrically conductive layer is absent. The glazing may further comprise one or more light such as an electrically powered light. Said one or more light may preferably be situated at the perimeter of the glazing. The light may be attached, directly or indirectly, to an external surface of the glazing or the light may be located inside the glazing, for instance the light may be laminated inside the glazing. The light may comprise an LED component or LED device which may be deposited onto a substrate such as a plastic film or a glass surface or laminated between substrates. Alternatively, the light may comprise one or more electroluminescent materials formed onto a substrate. Where the light is an electrically powered light, one or more conductors may be formed from an electrically conductive layer wherein said layer does not entirely block the passage of electromagnetic radiation through the glazing in the region of the sign.

Preferably the at least one electrically conductive layer contains metals, conductive organic polymers, conductive forms of carbon, and/or metal oxides made substantially conductive by doping. Particularly important examples of solar control electrically conductive layer materials include silver, copper, gold, aluminium, tin oxide, indium oxide and zinc oxide. The electrically conductive layer may decrease the emissivity ("low-e coating") of the glazing to achieve thermal insulation properties by reflecting the infrared radiation emitted by for instance the interior of a building, and/or to reduce its solar energy transmittance ("solar control coating") to shield interior rooms against the entry of excessive amounts of solar energy (heat). The electrically conductive layer may be a layer system with at least one transparent silver-based layer that follows the structure: glass/lower antireflection layer/silver-based layer/outer antireflection layer. In layer systems of this type, the silver layer serves mainly as an IR reflection layer, whilst the anti-reflection ("AR") layers may be employed, through suitable selection of material and thickness, to influence the transmission and reflection properties in the visible region of the spectrum, emissivity and solar energy transmittance, according to application.

Preferably the at least one transparent substrate is at least one transparent glass substrate. The transparent glass substrate may be clear or tinted. Preferably the transparent glass substrate is a clear transparent glass substrate. The transparent glass substrate may be a metal oxide-based glass pane. The glass pane may be a clear or tinted float glass pane.

Preferably the glass pane is a clear glass pane. A typical soda-lime-silicate glass composition is (by weight), $SiO_2$ 69-74%; $Al_2O_3$ 0-3%; $Na_2O$ 10-16%; $K_2O$ 0-5%; MgO 0-6%; CaO 5-14%; $So_3$ 0-2% and $Fe_2O_3$ 0.005-2%. The glass composition may also contain other additives, for example, refining aids, which would normally be present in an amount of up to 2%. By clear float glass, it is meant a glass having a composition as defined in BS EN 572-1 and BS EN 572-2 (2004). For clear float glass, the $Fe_2O_3$ level by weight is typically 0.11%. Float glass with an $Fe_2O_3$ content less than about 0.05% by weight is typically referred to as low iron float glass. Such glass usually has the same basic composition of the other component oxides i.e. low iron float glass is also a soda-lime-silicate glass, as is clear float glass. Typically tinted float glass has at least 0.5% by weight $Fe_2O_3$, e.g. 1.0% by weight $Fe_2O_3$. Alternatively the glass pane is a borosilicate-based glass pane, an alkali-aluminosilicate-based glass pane, or an aluminium oxide-based crystal glass pane.

Preferably the glazing comprises at least two transparent substrates, wherein the substrates are separated by a gap and/or at least one ply of an interlayer material is laminated between the substrates. Preferably the electrically conductive layer is located between said at least two transparent substrates. The interlayer material may be selected from the group consisting of polyvinyl butyral (PVB), Ethylene-Vinyl Acetate (EVA), polyethylene terephthalate (PET) and other polymeric interlayers.

Preferably the glazing further comprises a frame attached to the periphery of the glazing.

The frame may comprise any suitable surround that supports the glazing such as a window frame and/or a door.

According to a second aspect of the present invention there is provided a multiple glazing unit comprising:
  at least two transparent substrates that each comprise a first major surface and an opposing second major surface,
  wherein at least one of the transparent substrates is coated on the first major surface with an electrically conductive layer, wherein the electrically conductive layer is absent in one or more regions of the first major surface,
  wherein at least a portion of
    i) said one or more regions of the first major surface, and/or
    ii) corresponding regions of a different major surface of the at least two transparent substrates,
  bears a low-emissivity material, and
  wherein said one or more regions permit the passage of electromagnetic radiation through the glazing.

In the context of the present invention, the "corresponding regions" of another major surface means the regions of the opposing second major surface that entirely overlap with the one or more regions of the first major surface when viewed perpendicular to the first major surface.

In the context of the present invention, the passage of electromagnetic radiation "through the glazing" means the passage of electromagnetic radiation from a location exterior to a first exterior-facing transparent substrate to a location exterior to a second exterior-facing transparent substrate or vice versa.

Preferably, neighbouring transparent substrates of the at least two transparent substrates are separated by a gap and/or at least one ply of an interlayer material is laminated between the substrates. Preferably the electrically conductive layer and/or the low-emissivity material are located between two transparent substrates. Preferably the electrically conductive layer and the low-emissivity material are both located between the same two transparent substrates.

According to a further aspect of the present invention there is provided a method of preparing a glazing according to the present invention comprising:
  coating at least one transparent substrate with an electrically conductive layer,
  wherein either the electrically conductive layer is deposited through a mask and/or is partially removed after deposition of the electrically conductive layer, applying a low-emissivity material to at least a portion of
    i) said one or more regions of the first major surface, and/or
    ii) corresponding regions of the opposing second major surface.

The partial removal of the electrically conductive layer may be conducted using chemical, laser and/or sandblasting means. The chemical means may comprise removal with a concentrated solution of hydrofluoric acid.

Any feature set out above in relation to the first aspect of the present invention may also be utilised in relation to any other aspects of the present invention.

Any invention described herein may be combined with any feature of any other invention described herein mutatis mutandis.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

A BRIEF DESCRIPTION OF THE DRAWINGS

The invention will now be further described by way of the following specific embodiments, which are given by way of illustration and not of limitation, with reference to the accompanying drawings in which.

DETAILED DESCRIPTION OF THE INVENTION

Figure 1:
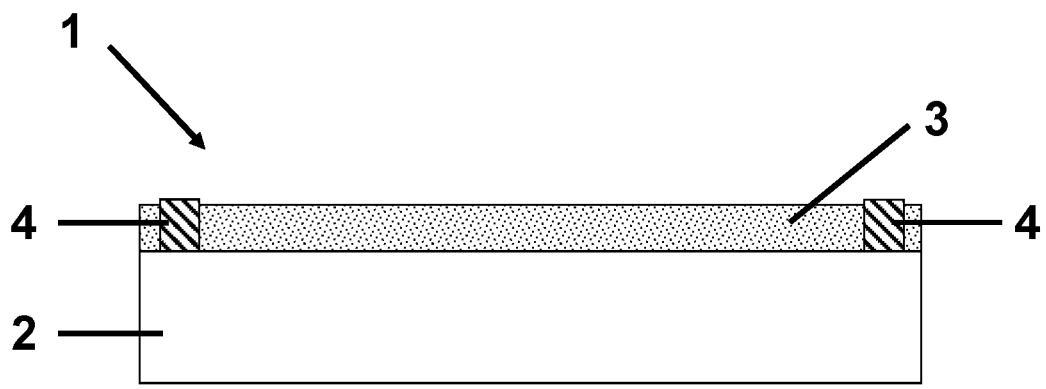
FIG. 1 shows a schematic cross-sectional view, taken along line A of FIG. 5, of a glazing in accordance with the present invention that utilises coated glass flakes dispersed within a coating.
Figure 5:
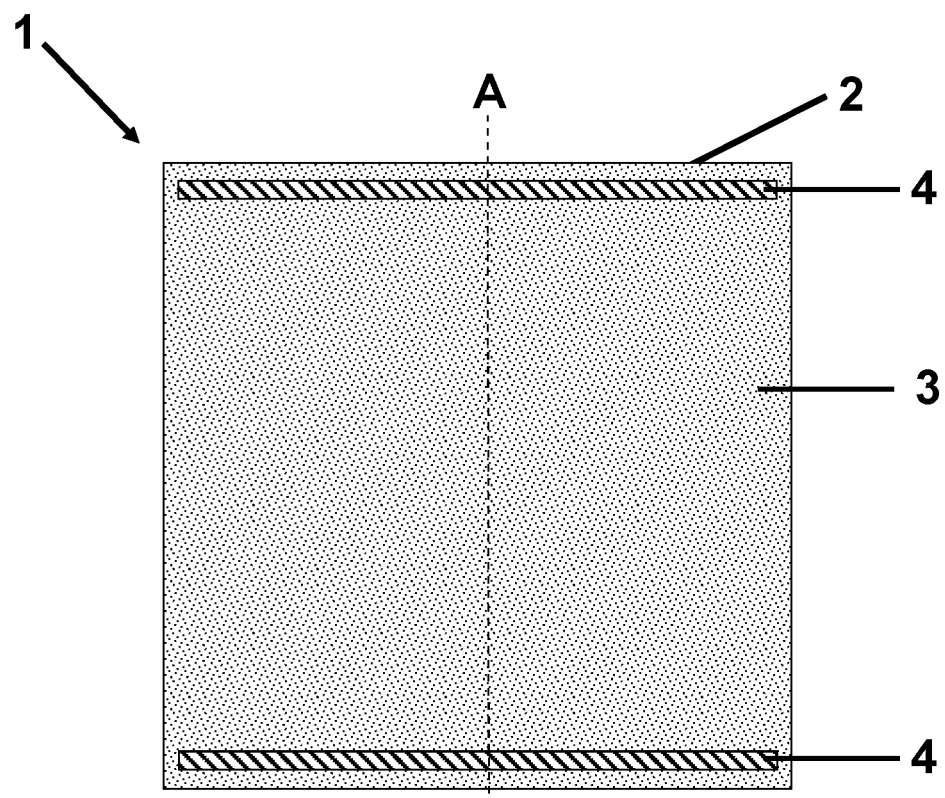
FIG. 5 shows a schematic plan view of the glazing shown in FIG. 1.

FIG. 1 shows a schematic cross-sectional view, taken along dashed line A of FIG. 5, of a glazing 1 in accordance with the present invention. Glazing 1 comprises a glass ply 2 that is coated on a major surface with an electrically conductive layer 3 that is a transparent multilayer stack that comprises at least one silver-based layer. The electrically conductive layer 3 is absent in two regions of the major surface adjacent two opposing edges of layer 3. These regions are coated with coating 4 consisting of Microglas® Metashine coated glass flakes (available from NGF Europe Limited, St Helens, UK) dispersed within a transparent paint. Whilst the presence of the glass flakes, which are coated with a silver-based layer, results in these regions exhibiting a degree of haze, it surprisingly ensures that the glazing both retains low-emissivity properties and permits the passage of electromagnetic radiation through the glazing 1.

FIG. 5 shows a schematic plan view of the same glazing 1 shown in FIG. 1. Coating 4 is located adjacent two opposing edges of layer 3 and extends along the majority of said edges.

Figure 2:
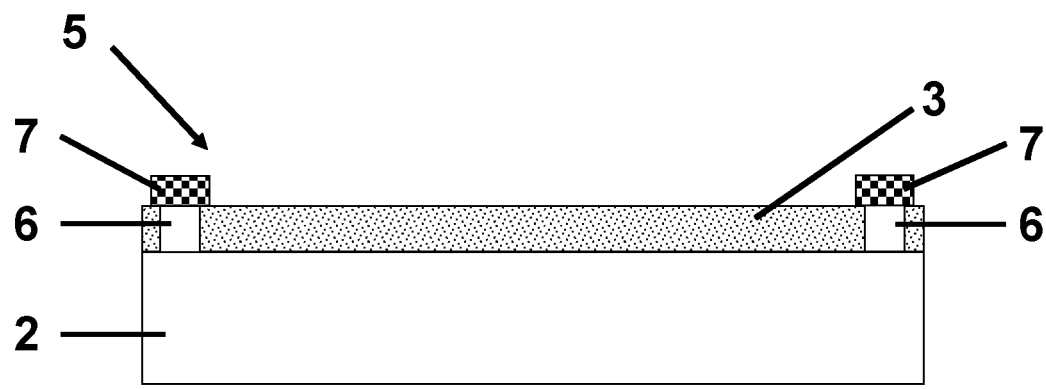
FIG. 2 shows a schematic cross-sectional view of a glazing in accordance with the present invention that utilises coated glass flakes dispersed within a polymer-based film.

FIG. 2 shows a schematic cross-sectional view of a glazing 5 in accordance with the present invention that utilises Microglas® Metashine coated glass flakes dispersed within a polyester-based film 7. Glazing 5 has the same construction as glazing 1 except that coating 4 is not present and instead film 7 covers the two regions 6 where the electrically conductive layer 3 is absent. Film 7 is attached to coating 3 and ply 2 via an adhesive (not shown).

Figure 3:
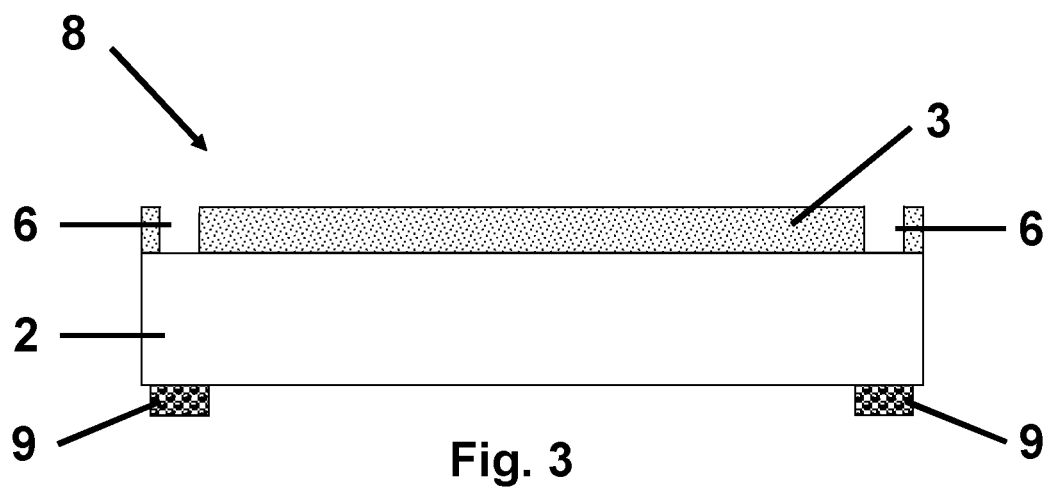
FIG. 3 shows a schematic cross-sectional view of a glazing in accordance with the present invention that utilises metal particles dispersed within a polymer-based film located on an opposing major surface.

FIG. 3 shows a schematic cross-sectional view of a glazing 8 in accordance with the present invention that utilises metal particles dispersed within a polymer-based film 9 located on an opposing major surface of glass ply 2. Glazing 8 has the same construction as glazing 5 except that film 9 is attached to corresponding regions of the opposing second major surface and contains metal particles rather than coated glass flakes.

Figure 4:
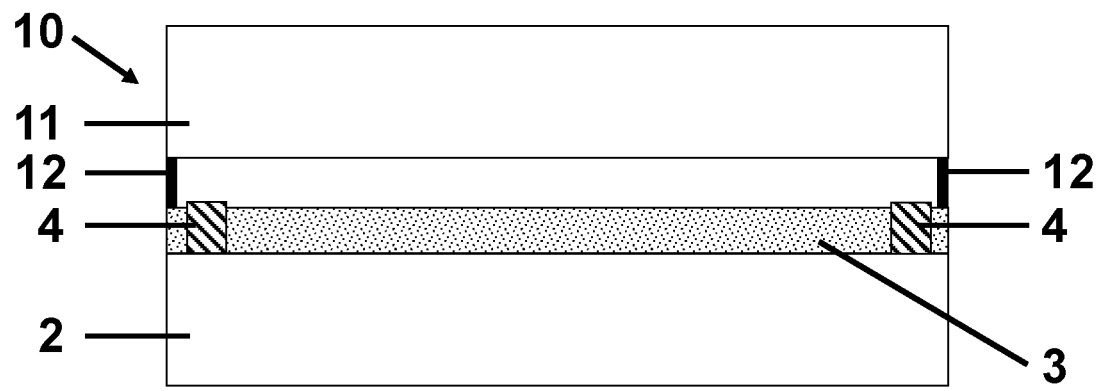
FIG. 4 shows a schematic cross-sectional view of a double glazing unit in accordance with the present invention that utilises coated glass flakes dispersed within a coating.

FIG. 4 shows a schematic cross-sectional view of a double glazing unit 10 in accordance with the present invention that utilises coated glass flakes dispersed within a coating. Unit 10 has the same construction as glazing 1 apart from the addition of a further glass ply 11 that is separated from electrically conductive layer 3 by two spacer bars 12.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A glazing comprising:
   at least one transparent substrate comprising a first major surface and an opposing second major surface,
   wherein said first major surface is coated with an electrically conductive layer,
   wherein the electrically conductive layer is absent in one or more regions of the first major surface,
   wherein at least a portion of
      i) said one or more regions of the first major surface, and/or
      ii) corresponding regions of the opposing second major surface,
   bears a low-emissivity material, and
   wherein said one or more regions permit the passage of electromagnetic radiation through the glazing.

2. The glazing according to claim 1, wherein at least a portion of each of said one or more regions of the first major surface where the electrically conductive layer is absent bears a low-emissivity material.

3. The glazing according to claim 1, wherein the glazing exhibits an emissivity of less than 0.4.

4. The glazing according to claim 1, wherein the low-emissivity material comprises one or more of a coated glass, a coated microbead, a dielectric multilayer coating, a metal and/or a metal oxide, and optionally, wherein the coated glass and/or coated microbead are coated with a low-emissivity coating that comprises at least one layer based on an IR reflective metal, or IR reflective metal oxide or a transparent conductive oxide (TCO).

5. The glazing according to claim 4, wherein the low-emissivity material comprises one or more of silver, gold, aluminium titania, alumina or a TCO.

6. The glazing according to claim 4, wherein the low-emissivity material is in the form of flakes and/or particles of the coated glass, the coated microbead, the metal and/or the metal oxide.

7. The glazing according to claim 6, wherein the low-emissivity material is in the form of flakes of coated glass, metal and/or metal oxide having an average thickness of from 0.1-10 µm.

8. The glazing according to claim 6, wherein the low-emissivity material is in the form of flakes of coated glass, metal and/or metal oxide having an average diameter of from 5-4000 µm, and/or wherein the low-emissivity material is in the form of flakes of coated glass, metal and/or metal oxide having an aspect ratio of average diameter divided by average thickness of greater than or equal to 10.

9. The glazing according to claim 6, wherein the low-emissivity material is in the form of particles of coated glass, coated microbead, metal and/or metal oxide having an average diameter of 1-1000 µm.

10. The glazing according to claim 6, wherein the low-emissivity material is in the form of particles of coated glass that comprise glass microspheres.

11. The glazing according to claim 1, wherein the low-emissivity material forms at least part of a coating and/or a film that is attached to the first major surface and/or the opposing second major surface of the substrate, and optionally wherein the low-emissivity material is dispersed within the coating and/or the film.

12. The glazing according to claim 11, wherein the low-emissivity material forms at least part of a layer either located in contact with the glazing, located within the coating and/or the film, or located on an exposed surface of the coating and/or the film.

13. The glazing according to claim 11, wherein the coating and/or film comprises at least 0.5 wt % of the low-emissivity material.

14. The glazing according to claim 1, wherein the density of the low-emissivity material is less than 5 g/cm$^3$.

15. The glazing according to claim 1, wherein the one or more regions of the first major surface where the electrically conductive layer is absent are arranged to allow the passage of electromagnetic radiation that corresponds to very high frequencies (30-300 MHz, 10 m-1 m), ultra high frequencies (300-3000 MHz, 1 m-100 mm), and/or super high frequencies (3-30 GHz, 100 mm-10 mm).

16. The glazing according to claim 1, wherein the one or more regions of the first major surface where the electrically conductive layer is absent and/or that bear the low-emissivity material are located within 100 mm of the periphery of the first major surface.

17. The glazing according to claim 1, wherein the one or more regions of the first major surface where the electrically conductive layer is absent and/or that bear the low-emissivity material are shaped as strips, and optionally wherein each strip is located substantially parallel to a nearest peripheral edge of the first major surface.

18. A multiple glazing unit comprising:

at least two transparent substrates that each comprise a first major surface and an opposing second major surface, wherein at least one of the transparent substrates is coated on the first major surface with an electrically conductive layer, wherein the electrically conductive layer is absent in one or more regions of the first major surface, wherein at least a portion of
  i) said one or more regions of the first major surface, and/or
  ii) corresponding regions of a different major surface of the at least two transparent substrates, bears a low-emissivity material, and wherein said one or more regions permit the passage of electromagnetic radiation through the glazing.

19. The multiple glazing unit according to claim 18, wherein neighbouring transparent substrates of the at least two transparent substrates are separated by a gap and/or at least one ply of an interlayer material is laminated between the substrates, and optionally wherein the electrically conductive layer and/or the low-emissivity material are located between two transparent substrates.

20. A method of preparing a glazing according to the present invention comprising:

coating at least one transparent substrate that comprises a first major surface and an opposing second major surface with an electrically conductive layer on the first major surface, wherein either the electrically conductive layer is deposited through a mask and/or is partially removed after deposition of the electrically conductive layer so that the electrically conductive layer is absent in one or more regions of the first major surface, and applying a low-emissivity material to at least a portion of
  i) said one or more regions of the first major surface, and/or
  ii) corresponding regions of the opposing second major surface.

* * * * *